United States Patent [19]

Schlunt et al.

[11] Patent Number: 4,504,923

[45] Date of Patent: Mar. 12, 1985

[54] REAL TIME TWO-DIMENSIONAL DIGITAL CORRELATOR

[75] Inventors: Richard S. Schlunt, Loma Linda; Hans-Peter Schmid, Alta Loma, both of Calif.

[73] Assignee: General Dynamics, Pomona Division, Pomona, Calif.

[21] Appl. No.: 399,407

[22] Filed: Jul. 19, 1982

[51] Int. Cl.³ ............................................. G06F 15/31
[52] U.S. Cl. ................................................... 364/728
[58] Field of Search ................. 364/728, 820; 382/42; 343/5 DP, 17.2 PC; 375/96

[56] References Cited

U.S. PATENT DOCUMENTS

| | | | |
|---|---|---|---|
| 3,908,118 | 9/1975 | Micka | 364/820 |
| 4,347,580 | 8/1982 | Bond | 364/824 |
| 4,368,456 | 1/1983 | Forse et al. | 364/728 |

*Primary Examiner*—David H. Malzahn
*Attorney, Agent, or Firm*—Henry M. Bissell; Edward B. Johnson

[57] ABSTRACT

A technique for correlating two images, differing in size, but of identical spatial content. The technique is based on the Cauchy-Schwarz Inequality and is derived in such a way as to eliminate the requirement for division, thereby realizing practical real time implementation with presently available electronic hardware. In the embodiment disclosed, reference and data image signals require no pre-processing for the removal of mean and gain factors prior to being individually supplied to the correlator. The correlator is built around modules which can be configured serially with delay lines to adapt to virtually any image configuration. Simulation tests have shown the embodiment to be superior to prior art correlators utilizing other algorithms under conditions of noise, offset and gain differences.

19 Claims, 9 Drawing Figures

CORRELATION BY
G ALGORITHM
( K=1, m=0, $\delta$=0 )

CORRELATION BY MAD
( K=1, m=0, $\delta$=0 )

CORRELATION BY
G ALGORITHM
( K=0.1, m=0, $\delta$=0 )

CORRELATION BY MAD
( K=1.05, m=3, $\delta$=2 )

CORRELATION BY
G ALGORITHM
( K=1, m=50, $\delta$=0 )

CORRELATION BY
G ALGORITHM
( K=1.05, m=3, $\delta$=2 )

CORRELATION BY
G ALGORITHM
( K=.35, m=20, $\delta$=6, SNR=.775 )

REAL TIME TWO-DIMENSIONAL DIGITAL CORRELATOR

BACKGROUND OF THE INVENTION

1. Field of the Invention

This invention relates generally to signal correlation and, more particularly, to the use of correlation techniques for image recognition.

2. Description of the Prior Art

Correlation techniques are useful in a variety of signal processing applications. As one example, signal correlation of radar return signals utilizing set delays can provide target detection and effective improvement of signal-to-noise ratio for return signals having average noise levels substantially greater than the signal level. A specialized variation of such techniques is disclosed in Mitchell U.S. Pat. No. 3,237,160 which involves correlation to identify a special code word form of data transmission.

Similar correlation systems for operating on radar signals are disclosed in Bailey U.S. Pat. No. 3,887,918, Wilmot U.S. Pat. No. 4,031,364 and Debuisser U.S. Pat. No. 4,156,876. Similarly, the digital delay line correlator of Harrison et al U.S. Pat. No. 3,947,672 is used in radar systems, among others, for detection of pulse repetition interval for a series of time spaced signal pulses.

The Schmitt U.S. Pat. No. 3,604,911 describes a digital correlator for measuring the extent of agreement between two distinct binary sequences of signals. The correlator there described utilizes a plurality of segment comparators respectively operating on the bits within the selected segments of the sequences of predetermined length.

Other fields of use involve data transmission in which identification of pre-existing transmitted codes or the comparison of two or more signals is performed for synchronization purposes or the like. Examples of such applications of signal correlation techniques are found in Dupraz et al U.S. Pat. No. 3,463,911, Jordan et al U.S. Pat. No. 3,947,673 and Gutleber et al U.S. Pat. No. 3,955,197.

Signal correlation may also be useful in systems for automatically comparing signals derived from aerial photographs to detect changes in photographs taken at different times, such as are important in spotting movements of troops or vehicles, the erection of military installations, and the like. A system which may be used for this purpose is disclosed in the Marsh U.S. Pat. No. 4,164,728.

An auto-correlation function method and apparatus are disclosed in Grandchamp U.S. Pat. No. 4,158,234 as used for determining the size of particles in Brownian motion.

When comparing two images taken at different times or from different systems, one is generally faced with problems relating to contrast differences, average intensity differences and noise. Contrast differences can be caused by changes in system gains, while average intensity differences can result from changes in light intensity and noise is usually of the electronic additive type.

The standard algorithm for comparing a reference D and an image C is $$F(C,D) = (C \cdot D / |C||D|) \quad (1)$$

where "." denotes the dot product and the reference D and image C are treated as vectors. Direct implementation of this function, however, requires division which is difficult to accomplish at real time rates using a cost effective hardware implementation. If the components of C and D are restricted to 1 and 0, then this approach is similar to that which is the subject of the Hogan et al U.S. Pat. No. 4,244,029 where the disclosed correlation function is the mean absolute difference (MAD).

SUMMARY OF THE INVENTION

If C and D are two nonzero two-directional vectors, each extending in two orthogonal directions then Equation (1) above represents the cosine of the angle between vectors C and D. It can be shown that for C and D of any dimension (or extent), $$F(C,D) \leq 1 \quad (2)$$

and $$F(C,D) = 1 \quad (3)$$

if and only if $C = kD$ where k is a non-negative scalar.

Equation 2 is referred to as the Cauchy-Schwarz Inequality. If C is held fixed, then F(C,D) serves as the usual indication of how well D corresponds to C. Thus, the value of D which maximizes F(C,D) would be considered the best match to C.

To avoid the division required in performing the algorithm of equation (1) directly, a new function is defined in accordance with principles of the present invention. For C and D elements of $R^p$, where R is the set of real numbers and p is the dimension of the vectors C and D, a function G is defined to be $$G(C,D) = [|C||D| - (C \cdot D)]/p \quad (4)$$

It follows from equations (2) and (3) that G(C,D) is non-negative; furthermore, G(C,D)=0 if and only if $C = kD$ for some scalar k. G(C,D) can be used as a measure of correlation between D and some fixed C; this calls for searching for the value D which minimizes G(C,D).

In finding the location of a reference image within the field of view (FOV) of a video sensor, it is assumed that both images are of the same spectral frequency content and are digitized into picture elements (pixels) having the same spatial resolution. Under these conditions, the digitized video image can be represented by an M×N matrix of pixels [I(i,j)] where the values of M and N are fixed by the choice of sampling rate and the number of TV lines per frame, or the number of equivalent detectors. The reference can be represented by a K×L matrix of pixels [R(i,j)] where K is less than M and L is less than N. To locate the reference in the image [I], one must compare the reference matrix to every K×L sub-matrix [I(i,j,p,q)] contained on [I] where $$I(i,j,p,q) = I(p+i, q+j) \quad (5)$$

for $$0 \leq i \leq K-1, \ 0 \leq j \leq L-1, \ 1 \leq p \leq N-K \text{ and}$$
$$1 \leq q \leq M-L.$$

The sub-image [I(i,j,p,q)] representing the reference in the image [I] can be modeled as $$I(i,j,p,q) = k(R(i,j) + M) + N(i,j) \quad (6)$$

where k represents the gain, M the offset (or difference in average image intensity) and N(i,j) is zero mean noise.

From equation (6), it is apparent that an effective algorithm for image correlation must be able to remove or eliminate the effects of gain and offset as well as to suppress noise. To be of practical value, the hardware implementation must be cost effective for real time operation.

Image correlation requires that the reference R be stored and that comparisons be made to a corrupted image, as modeled in equation (6).

To calculate G(R,V) in real time requires a capability of accumulating the sums of products in real time, since $$|V|^2 = \sum_{i=1}^{P} V_i^2 \text{ where } V = (V_i) \quad (7)$$

and $$V \cdot R = \sum_{i=1}^{P} V_i R_i \text{ where } R = (R_i) \quad (8)$$

In practice V will be configured as a K×L matrix where p=KL. Thus it will be convenient to rewrite $V^2$ and V·R as $$|V|^2 = \sum_{j=0}^{K-1} \left( \sum_{i=1}^{L} V_{jL+i} \right) \quad (9)$$

and $$V \cdot R = \sum_{j=0}^{K-1} \left( \sum_{i=1}^{L} (V_{jL+i})(R_{jL+i}) \right) \quad (10)$$

Thus, a processor to implement G(R,V) can consist of K modules operating on K distinct segments of V containing L components.

A single such module in accordance with the present invention, designated a Q-module, comprises a pair of shift registers, each of length L, one for the reference and one for the source signals. Recirculation between input data samples of the L samples stored in each shift register is effected by associated recirculating clocks which run at a rate of L times the rates of input data clocks, also associated with the respective registers. The input to the source shift register is the function [I(i,j)], while the input to the reference shift register is the function [R(i,j)].

Accumulators are associated respectively with the two shift registers, being coupled to the respective inputs and outputs through squaring circuits, in order to keep a record of the squares of the values contained in the shift registers. The shift registers are loaded with zeros upon startup. Thus the magnitudes of the vectors stored in the shift registers are available at the outputs of the respective accumulators at any given time.

The inputs and outputs of the two shift registers are also coupled to a common multiplier where the dot product of the data is performed. The output of the dot product multiplier stage is applied to a third accumulator, the output of which equals the dot product of the reference data and the source data. The Q-module operates to accept a continuous flow of data and to develop the magnitudes and dot products of the vectors contained in the two shift registers as Q-module outputs.

A plurality of these Q-modules (in number equal to K) is combined with a plurality of delay lines interspersed between the individual input and output lines of the source shift registers to form a serial string. Three individual summing stages are provided for summing respectively the magnitude outputs of the source and reference signal shift registers and the dot product outputs of all K Q-modules. Outputs of the two summation stages associated with the source and reference magnitudes are coupled to a multiplier, the output of which is applied to a square root stage and thence to a further summation stage coupled to the summation stage for the dot products. The output of this further summation stage represents the function G(R,V). Operation of this circuit provides a comparison of every K×L sub-image with the stored reference.

BRIEF DESCRIPTION OF THE DRAWING

A better understanding of the present invention may be gained from a consideration from the following detailed description, taken in conjunction with the accompanying drawing in which.

DESCRIPTION OF THE PREFERRED EMBODIMENT

Figure 1:
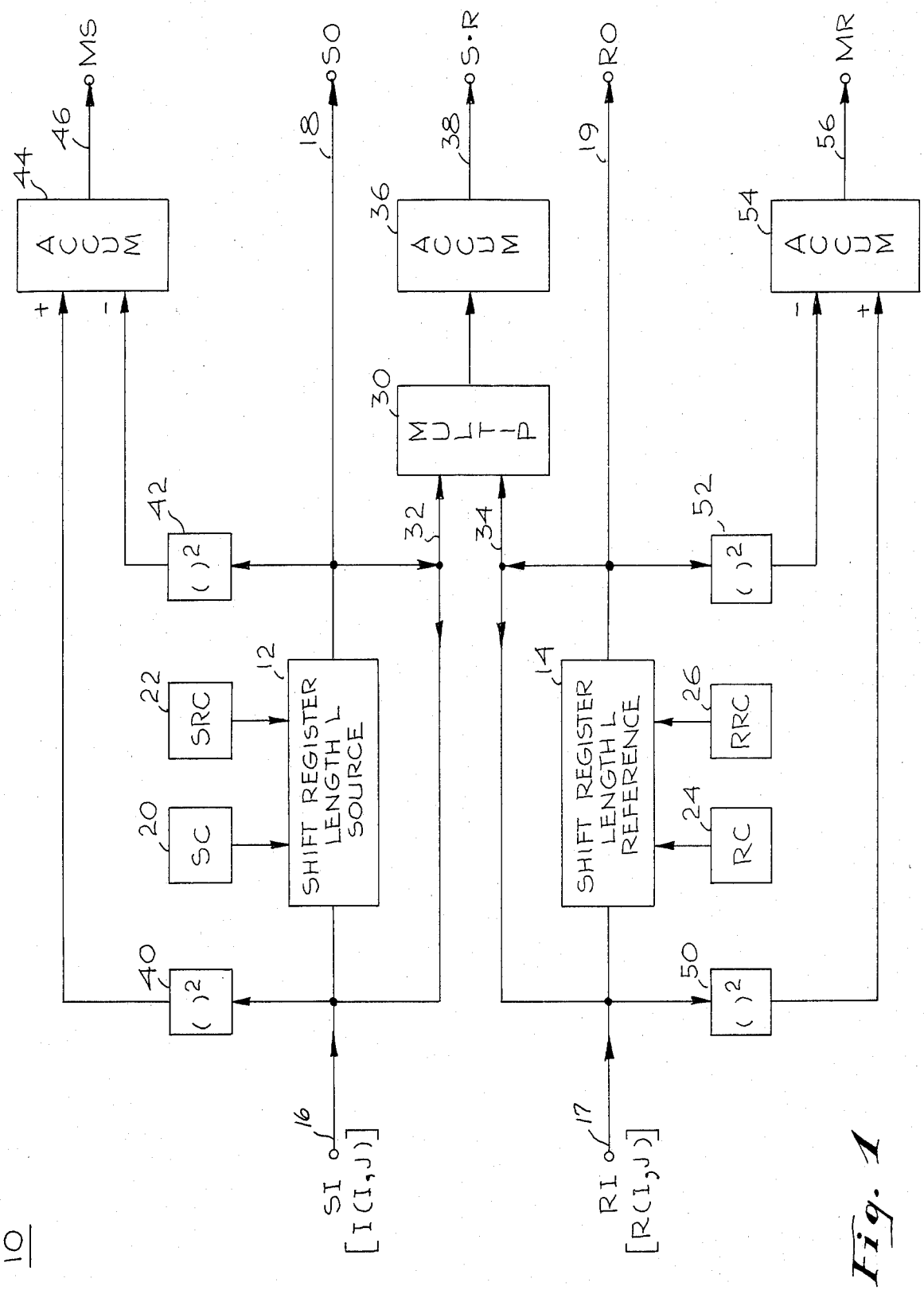
FIG. 1 is a functional block diagram of a module (the Q-module) utilized in the practice of the present invention.

In FIG. 1, a functional block diagram of a basic processing module (called the Q-module) utilized in the practice of the present invention, the Q-module 10 is shown having a pair of shift registers 12 and 14, each of length L. Shift register 12 is designated the "source" shift register, and shift register 14 is designated the "reference" shift register. The shift register 12 has respective input and output terminals 16, 18, designated SI and SO. Similarly the reference shift register 14 has respective input and output terminals 17, 19, designated RI and RO. The source shift register 12 is controlled by an input clock 20 and a recirculating clock 22, while the reference shift register 14 is controlled in similar fashion by an input clock 24 and a recirculating clock 26. The pulse rates of the recirculating clocks 22, 26 are L times the rates of the input clocks 20, 24. A multiplier stage 30 is coupled to receive inputs from the shift registers 12 and 14. One input 32 of the multiplier 30 is coupled to both the input 16 and output 18 of the source shift register 12. The other input 34 of the multiplier 30 is coupled to both the input 17 and the output 19 of the reference shift register 14. The multiplier 30 performs the dot product multiplications of signals applied to the inputs 32, 34 which are accumulated in an accumulator stage 36 and supplied as the dot product S·R at output line 38. Signal squaring stages 40 and 42 are also connected respectively to the input 16 and output 18 of the source shift register 12. The outputs of these signal squaring stages 40, 42 are applied as plus and minus inputs to an accumulator 44, the output of which constitutes the source magnitude (MS) signal on output line 46 of the Q-module 10. Similarly, a pair of signal squaring stages 50, 52 are connected respectively to input 17 and output 19 of the reference shift register 14, and these squared signal outputs are supplied to the plus and minus inputs of an accumulator 54 to develop on output line 56 the reference magnitude (MR) signal.

In the operation of the Q-module of FIG. 1, source and reference data signals, represented respectively as the functions [I(i,j)] and [R(i,j)], are applied to the respective shift registers 12 and 14. These are processed in blocks of L samples. Between successive blocks of input data samples, the L samples stored in each of the two shift registers 12, 14, are recirculated under control of the recirculating clocks 22, 26. After recirculating, the dot product of the two vectors stored in the shift registers 12, 14 appears at the S·R output 38.

As data is loaded into the shift registers, a record is kept of the squares of the values entering the shift registers and the squares of the values leaving the shift registers. If the shift registers 12, 14 are loaded with zeros on startup, the magnitudes of the vectors stored in the respective shift registers are available at the MS and MR outputs 46, 56 at any given time. Thus, at the end of a recirculation cycle, the magnitudes and dot product of the vectors contained in the respective shift registers are available on module output lines 46, 56 and 38.

Figure 2:
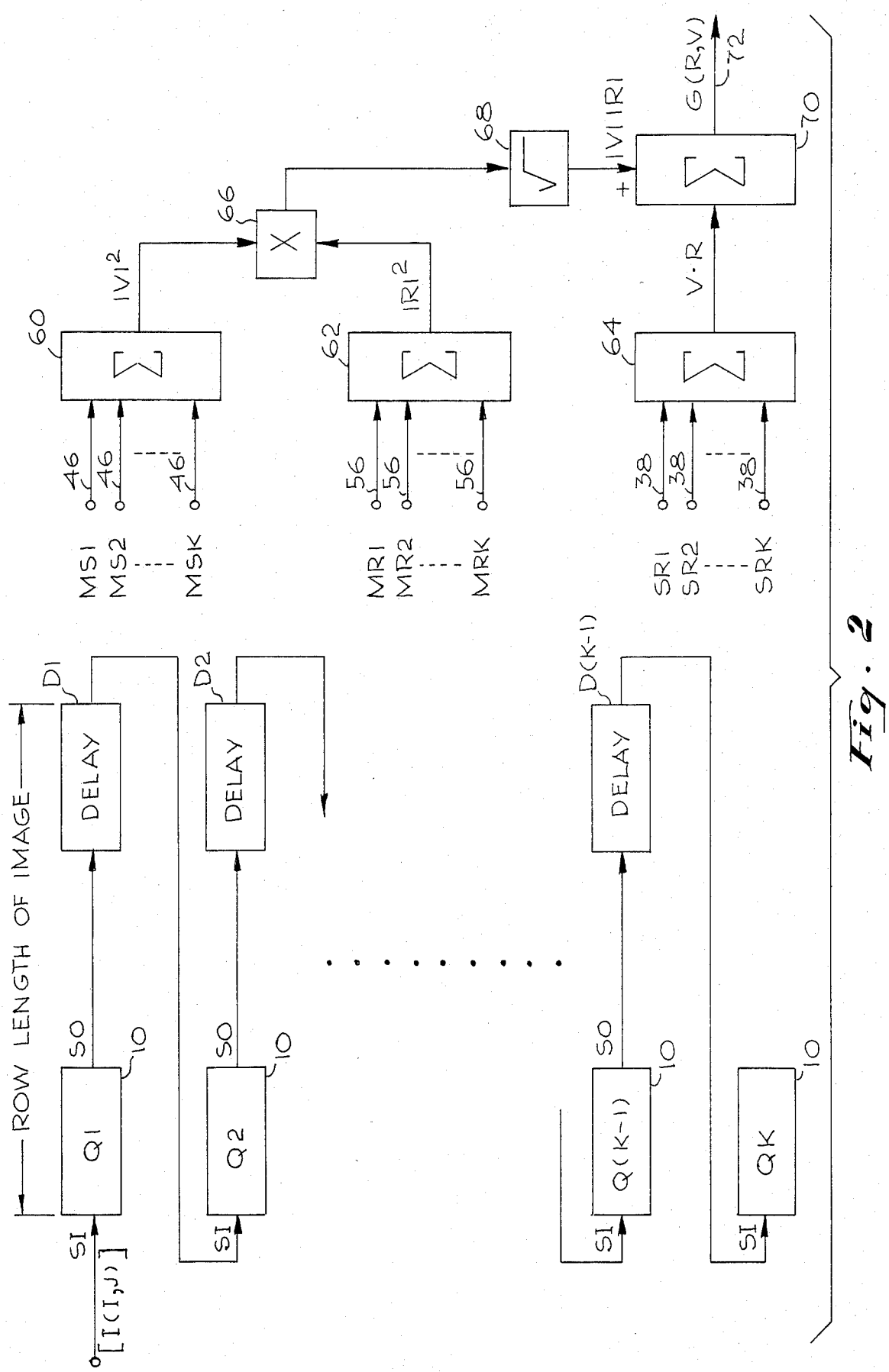
FIG. 2 is a functional block diagram of an arrangement in accordance with the invention, utilizing a plurality of the modules of FIG. 1.

A plurality of Q-modules 10 of FIG. 1 (numbers Q1-QK) is interconnected with associated circuitry as indicated in FIG. 2. As shown in FIG. 2, the first Q-module Q1 is connected in series with a delay stage D1 so that its SO output (line 18 of FIG. 1) is coupled to the input of delay stage D1. The time delay of a delay stage is chosen so that a Q-module shift register and its following delay stage are effective to store one row of the image being compared. The output of the delay stage D1 is connected to the SI input of the second Q-module Q2 (line 16 of FIG. 1), the SO output of which is coupled to a second delay stage D2. Succeeding Q-modules 10 and delay stages D are serially connected in similar fashion through the Q-module Q(K−1) and delay stage D(K−1) to the final Q-module QK.

The MS lines 46 of each of the K Q-modules (MS1, MS2 ... MSK) are applied to a first summation stage 60. Similarly, the MR outputs 56 of the K Q-modules (MR1, MR2 ... MRK) are applied as inputs to a second summation stage 62. A third summation stage 64 is connected to receive the S·R outputs of the Q-modules (SR1, SR2 ... SRK). The output of the first summation stage 60, representing the function $|V|^2$, and the output of the second summation stage 62, representing the function $|R|^2$, are applied to a multiplier 66, the output of which is applied to a square root taking stage 68 which develops the function $|V||R|$. This is applied to a fourth summation stage 70.

The output of the dot product summation stage 64 is the dot product V·R which is applied to the summation stage 70 for combination with the output of the square root stage 68 to develop the output function G(R,V) on output line 72.

Since the Q-modules are constructed to operate continuously as data is applied in real time, the output line 72 of the circuit arrangement of FIG. 2 carries the desired calculation of the function G(R,V) in real time. In the operation of the circuit of FIG. 2, it will be understood that the reference R, a K×L matrix, has been loaded into the reference shift registers 15 of all K Q-modules. Immediately upon loading the reference R, there is available the function $|R|^2$. The corrupted image, which contains the reference, is loaded serially into the source side of the Q-module Q1. Between samples of the source, G(R,V) is calculated for the vector V contained in the respective source registers 12 of the K Q-modules. In this way, every K×L sub-image is compared with the stored reference.

This correlation system provides the following significant advantages over other correlation schemes which are known.

1. No division is involved.
2. The system is not limited to one or two bit digitization.
3. The system operates in real time.
4. The system lends itself to implementation by VLSI techniques.
5. The system is immune to changes in gain factors.
6. The system is immune to moderate offsets.

Particular advantages of the system of the invention may be appreciated from a review of FIGS. 3-9 which represent the results of testing particular embodiments of the invention while varying certain control parameters and comparing the system of the invention with a system operating on the conventional mean absolute difference (MAD) algorithm.

In this simulation to demonstrate the effectiveness of the algorithm utilized in the inventive embodiment (equation (4) above), the function G was evaluated by using a particular 64×64 pixel image array. The test image was constructed in simulation of a terrain area. Each pixel was represented by an 8-bit binary number correspondind to levels between 255 (white) and 0 (black). The minimum pixel magnitude was 139, the mean was 155, and the maximum was 207. A 16×16 pixel sub-array of this test image was designated as the reference, which in turn was correlated with a corrupted version of the original image to demonstrate performance. This is equivalent to setting the dimension p in equation (4) equal to 256, or considering the 16×16 array as a vector of dimension 256. The corrupted image array was computed in the following manner. If [I(i,j)] represents the original image array, then $$[T(i,j)] = [k(I(i,j)+m)+N(i,j)] \tag{11}$$

represents the corrupted image, where K represents a gain, m an offset, and N(i,j) random Gaussian noise with zero mean and variance $\sigma^2$. The signal to noise ratio (SNR) with respect to the reference was computed using $$SNR = k|R - \text{Mean}_R|/\sigma \tag{12}$$

The values of G(R,V) were then computed for each V, where V is any 16×16 sub-array contained in [T(i,j)]. These values were then subtracted from 255 in order to make the minimum a maximum. The results are displayed in the three-dimensional plots of FIGS. 3-6 and 9, scaled from 0 to 255 along the vertical axis.

Figure 3:
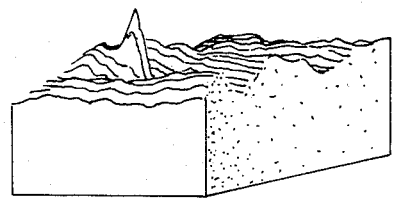
FIGS. 3–9 are three-dimensional graphical plots showing the results of simulated testing of correlation algorithms under varying conditions of control variables.
Figure 4:
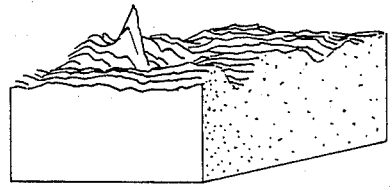
Figure 8:
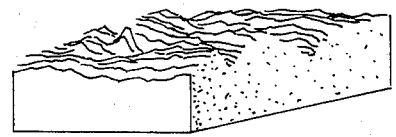
Figure 5:
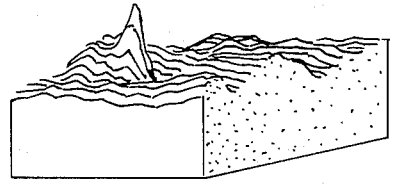
Figure 9:
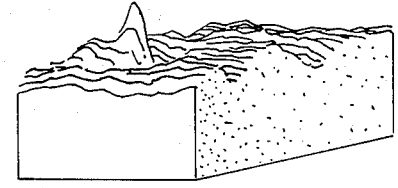

To verify the independence of G to changes in gain, gain (K) was set at 1 and at 0.1, the other variables remaining at 0. The correlation results are shown in FIGS. 3 and 4, respectively, and indicate insignificant variation between the two conditions.

To verify the independence of G to changes in offset, the values of G were computed for the case: K=1, m=50, $\sigma$=0. This result is displayed in FIG. 5 and shows that the offset had little effect on the correlation peak when compared to the ideal case shown in FIG. 3.

Figure 6:
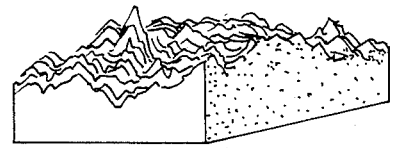

To assess the overall performance for combined offset and noise, the values of G were computed for the case k=0.35, m=20, $\sigma$=6. The SNR for this condition is 0.775. The result is depicted in FIG. 6 which shows that, while the perturbations resulting from these severe signal interference conditions are significant, the correlation peak is still manifestly apparent.

For comparison with correlation techniques utilizing the mean absolute difference (MAD) algorithm, which uses the function S defined by $$S(R,V) = \sum_{j,i} |R(i,j) - V(i,j)| \tag{13}$$

Figure 7:
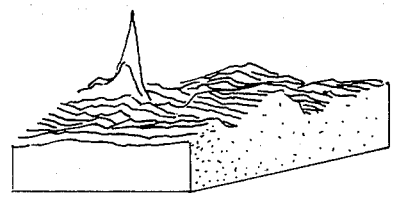

S and G were compared for the case k=1, m—0, $\sigma$=0 to establish base line performance. The result of the MAD algorithm is shown in FIG. 7. Comparison of FIG. 7 with FIG. 3 suggests that the MAD algorithm might be a better choice for correlation, since the correlation peak is more prominent. To simulate a more realistic situation, however, noise was introduced and the gain was changed by 5%. The results for the S function and the G function are shown respectively in FIGS. 8 and 9. As is clearly evident in FIG. 8, the correlation peak for S has virtually disappeared under these conditions while the peak for the G correlation function (FIG. 9) remains unchanged.

Further testing and comparison under simulated conditions were conducted for a number of other reference locations in the image array. In each case, where differences in gain and noise were introduced, the G function algorithm out-performed or matched the S function algorithm. A comparison was also made of the G function against the function F(C,D) defined above in equation (1). The results for the two functions were virtually identical; this was expected, since the G function was derived from F. The form of the G function utilized in the invention was chosen for simplicity of hardware implementation.

As has been demonstrated, the G correlation function implemented in the system represented in FIG. 2 operates effectively to develop correlation results which are superior to those of alternative algorithms, particularly where the effects of noise and gain variations are considered. At present, commercial multipliers are available which can be operated at a 17 megahertz rate. Thus a Q-module (FIG. 1) with an 8 bit long shift register (L=8) can be operated at a 2 megahertz data rate. Using 128 of the Q-modules (4 in each row), it is possible to locate a 32×32 pixel reference contained in a 256×256 pixel array within 1/30 seconds. Using VSLI techniques, it should be possible to develop a Q-module capable of handling an 8 bit input in a single package.

Although there have been described above specific arrangements of a real time two-dimensional digital correlator in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A two-dimensional digital correlator for comparing succeeding portions of a source vector and a reference vector in real time and providing an indication of correlation between them comprising:
    means for repetitively comparing a reference vector with successive portions of a source vector, the reference vector being of a dimension less than or equal to the source vector;
    means coupled to the comparing means for developing signals from said repetitive comparisons corresponding respectively to categories of magnitudes of the source vectors, magnitudes of the reference vector, and dot products of the reference and source vectors;
    a plurality of summing means coupled respectively to the signal developing means for summing said signals by categories to develop summations in respective categories;
    means coupled to selected summing means for multiplying together the summations of the magnitude signals and taking the square root of the resulting product; and
    further summing means coupled to the square root taking means and the remaining summing means for summing said square root and the summation of the dot product signals to provide an image correlation output in real time with said comparisons.

2. The correlator of claim 1 wherein the comparing means comprise first and second shift registers operating in parallel, the first shift register being connected to operate on the reference vector input and the second shift register being connected to operate on the source vector input.

3. The correlator of claim 2 wherein the comparing means further include a plurality of clock means individually associated with respective shift registers for driving the shift registers in synchronism, said clock means comprising for each shift register an input clock and a recirculating clock, the pulse rate of the recirculating clock operating at a selected multiple of the pulse rate of the input clock.

4. The correlator of claim 3 wherein said selected multiple is equal to the cycle length of the shift register.

5. The correlator of claim 2 wherein the signal developing means comprise a signal multiplier stage and a first accumulator connected in series, the multiplier stage being coupled to the respective shift registers to provide dot product multiplication of the reference and source vectors.

6. The correlator of claim 5 wherein the signal developing means further include a plurality of signal squaring stages respectively coupled to the source shift register and the reference shift register to provide signals corresponding to the squares of the reference and source signals at the respective shift registers.

7. The correlator of claim 6 wherein the signal developing means further include a pair of second accumulators respectively coupled to accumulate the outputs of the squaring stages associated with a corresponding shift register and develop a magnitude signal of the vector being processed by the associated shift register.

8. The correlator of claim 7 wherein the first and second shift registers, the associated clock means, the multiplier stage, the squaring stages and the associated accumulators comprise a single Q-module, the correlator comprising a plurality of said Q-modules connected in series with a plurality of delay lines respectively interspersed between Q-modules to develop said repetitive comparisons.

9. The correlator of claim 7 wherein the summing means comprise first, second and third summation stages for respectively summing the source vector magnitude signals, the reference vector magnitude signals and the dot product signals for providing respective absolute value squared terms for application to the multiplying means.

10. The correlator of claim 9 wherein the repetitively comparing means comprises a plurality of like signal-processing modules connected in series for processing of the source vectors and a plurality of time delay stages respectively interspersed between adjacent modules.

11. The correlator of claim 10 wherein the time delay of a delay stage is selected to provide a combined storage capability of the delay stage and its preceding module corresponding to a row length of the source vector.

12. A two-dimensional digital correlator for comparing first and second image vectors in real time and providing an indication of correlation between the vectors comprising:
means for processing said first and second image vectors in accordance with the correlation function:

$$G(C,D) = [|C||D| - (C \cdot D)]/p$$

where C and D are nonzero, two-dimensional vectors and p is the dimension of said vectors, said means including
(1) a plurality of Q-modules interspersed with delay lines and connected in series, each Q-module including means for comparing the first and second image vectors with each other and providing signals representing the squares and dot products, respectively, of individual elements within the image vectors;
(2) first means coupled to the Q-modules for summing the squared signals from the two vectors, multiplying the sums together and taking the square roots of the resulting products;
(3) second means coupled to the Q-modules for summing the dot product signals; and
(4) output means coupled to the first and second means for providing output signals representing the difference between the square roots and the dot product signals.

13. The method of providing an indication of correlation between first and second image vectors in real time comprising:
performing said correlation in accordance with the correlation function:

$$G(C,D) = [|C||D| - (C \cdot D)]/p$$

where C and D are nonzero, two-directional image vectors and p is the dimension of said vectors, the correlation performing step comprising:
(1) applying signals representing the first and second image vectors to the first of a succession of Q-modules interspersed with corresponding delay lines and connected in series with each other;
(2) comparing the first and second image vector signals within the respective Q-modules and developing signals from successive comparisons representing respectively the squares and dot products of the first and second image vectors;
(3) respectively summing the squared signals from the two vectors in first and second summing stages;
(4) multiplying the corresponding sums together and taking the square roots of the resultant products;
(5) summing the individual dot product signals in a third summing stage; and
(6) combining the square root signals and the output of the third summing stage in a fourth summing stage to develop an output signal representing the difference between the square root signals and the dot product signals.

14. The method of claim 13 wherein one of said image vectors is a reference vector which is of lesser dimension than the other vector, said reference vector being modeled in the form $$I(i,j,p,q) = k(R(i,j) + M) + N(i,j)$$

where R(i,j) represents a matrix of pixels i, j of lesser extent than said other vector and wherein i, j, p, and q are individual pixels in a submatrix I(i,j,p,q) corresponding in extent to said matrix of pixels i, j within said other vector, k represents gain, M represents offset, and N(i,j) is zero mean noise.

15. The method of claim 14 wherein the step of comparing the vectors within the Q-modules further includes the steps of storing the reference vector and repeatedly comparing the stored reference vector to successive portions of the other image vector.

16. The method of correlating in real time a first image vector representing a source and a second image vector representing a reference, the reference vector being of a dimension less than or equal to the source vector, comprising the steps of:
repetitively comparing the reference vector with successive portions of the source vector;
developing signals from said repetitive comparisons corresponding respectively to categories of magnitudes of the source vectors, magnitudes of the reference vectors, and dot products of the reference and source vectors;
summing said signals by categories to develop corresponding summation signals;
multiplying together the summations of the respective magnitude signals and taking the square root of the resulting product; and
summing said square roots and the summations of the dot product signals to provide an image correlation output.

17. The method of claim 16 wherein the comparing step comprises applying the first and second image vectors to respective shift registers and successively circulating the vectors through the shift registers to develop signals in the respective categories.

18. The method of claim 17 wherein the step of successively circulating the vectors includes recirculating the signals stored in the respective shift registers at intervals between successive cycle times of the shift registers.

19. The method of claim 17 further including the step of setting the shift registers to zero prior to beginning the comparison of the reference and source vectors.

* * * * *